United States Patent Office 3,395,137
Patented July 30, 1968

3,395,137
PROCESS FOR RENDERING HIGH MOLECULAR WEIGHT COMPOUNDS RESISTANT TO ELECTROSTATIC CHARGE
Eugen Reindl, Burgkirchen (Alz), Günter Rummert, Burghausen (Salzach), Dietrich Schleede, Frankfurt am Main, and Felix Schülde, Neuenhain, Taunus, Germany, assignors to Farbwerke Hoechst Aktiengesellschaft vormals Meister Lucius & Brüning, Frankfurt am Main, Germany, a corporation of Germany
No Drawing. Filed Sept. 21, 1965, Ser. No. 489,050
Claims priority, application Germany, Sept. 26, 1964, F 44,075
13 Claims. (Cl. 260—94.9)

The present invention relates to a process for rendering high-molecular weight compounds resistant to electrostatic charge.

High-molecular weight substances have the disadvantage that they accumulate electrostatic charge, especially if they possess good electrical properties. Owing to this electrostatic charging, shaped articles made of, or containing, such substances have more pronounced tendency to attract dust. The result of this is that the surfaces of such shaped articles exhibit, for example, the well known stains, crow's feet and zigzag designs, while fibres and fabrics become soiled within a short time. In addition to the pronounced soiling owing to electrostatic charge there may also be a potential difference, which under certain circumstances may be very high and which may give rise to sparking. Owing to these disadvantages arising from electrostatic charge, the use of high-molecular weight substances, for example, plastics, may be unsuitable for many fields of application.

The electrostatic charge of high-molecular weight compounds can be prevented or reduced by conditioning, or by one of the two following fundamental methods:

(1) Rendering shaped articles resistant to electrostatic charge subsequent to manufacture by impregnation with solutions or dispersions of antistatic agents, which are in many cases somewhat hygroscopic. In this method, the surfaces of the shaped articles made of plastic materials are rendered conductive, that is to say, the surface resistivity is strongly reduced so that electrostatic charge applied to the surface can flow off. The disadvantage of this method of rendering materials resistant to electrostatic charge is obvious; when the conductive layer is damaged or wiped off the antistatic effect is likewise lost.

(2) Incorporation of substances that prevent an electrostatic charge accumulating on shaped articles made of plastic materials. This method has considerable advantages in comparison with the above impregnation method. The antistatic effect is not restricted to the surface of the shaped articles, and the antistatic layer cannot be wiped off, scratched off or detached mechanically. In attempts to incorporate the antistatic agents used for the impregnation method in plastic materials, the surprising observation was made that the said compounds generally lose their efficacy. In some cases, this is due to the fact that they partially or wholly decompose at the rather high processing temperatures that are sometimes used for the plastic materials. However, it has been found that compounds that are stable at these temperatures have no antistatic efficacy after incorporation in the plastic material. There is obviously a fundamental difference between the reaction mechanism in the method of rendering shaped articles resistant to electrostatic charge by the above incorporation, and the reaction mechanism in the impregnation process.

This can also be proved by measurement. While the surface resistivity is strongly reduced by impregnation with antistatic agents, the surface resistivity is substantially unaffected by the incorporation of antistatic agents, even when the latter are very effective. In this case, the electrostatic charge cannot flow off at the surface of the articles, but instead the transmission resistivity is in most cases slightly modified. It has been found that this method of measurement is also not a measure of the resistance to electrostatic charge.

Various substances have been proposed for rendering articles resistant to electrostatic charge by subsequent impregnation. Exemplary of such substances are the following:

(a) nitrogen-containing compounds, especially amines, for example a variety of selected alkylol amines as well as substituted alkylene diamines containing hydroxyl groups and quaternary ammonium salts,
(b) sulphonic acids and aryl-alkyl-sulfonates,
(c) phosphoric acids, aryl-alkyl-phosphates and phosphoric acid ester amides,
(d) polymers of polyhydric alcohols and the derivatives thereof.

It is known that strongly hygroscopic inorganic salts may be used as antistatic agents that are capable of being incorporated in the plastic material. However, they are not generally used because there would be a risk of corrosion occurring on the processing machines.

Now we have found a process for rendering high molecular weight organic compounds, preferably thermoplastic materials, resistant to electrostatic charge, which comprises incorporating to the high molecular weight organic compound as an anti-static agent at least one polymer of an N-alkyl-substituted phosphoric acid amide in an amount within the range of from 0.1 to 7% by weight, preferably 0.2 to 4% by weight, calculated on the high molecular weight compound, the P-atoms of the polymer of the N-alkyl-substituted phosphoric acid amide being chemically bonded through oxygen or nitrogen atoms, the proportion of P:N being 1:1 to 1:2; and the N-alkylamide groups having the formula

wherein $R_1$ means H or an alkyl group having 1 to 4 carbon atoms, and $R_2$ means an alkyl group having 10 to 26, preferably 12 to 18 carbon atoms.

Such polymeric linear or cross-linked N-alkyl-substituted phosphoric acid amides may be obtained, for example, by reacting 1 mol of phosphorus pentoxide with 2 to 4 mols of an N-alkylamine, however, instead of phosphorus pentoxide there may also be used metaphosphoric acid as a starting product.

According to the invention, there are preferably used as antistatic agents N-alkyl-substituted phosphoric acid amides of the following formula

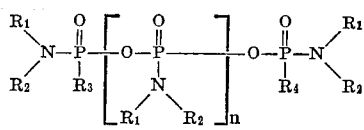

in which $R_1$ means —H or -alkyl having 1 to 4 carbon atoms, preferably -methyl,
$R_2$ means -alkyl having 10 to 26, preferably 12 to 18 carbon atoms,
$R_3$ and $R_4$ each mean, independently of one another,

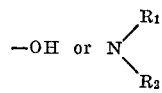

or together

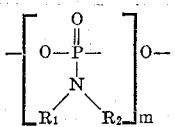

$n$ means a number from 0 to 20, preferably 0 to 6, and $m$ means 1 or 2.

According to the invention, there may be used the following compounds as antistatic agents, for example:

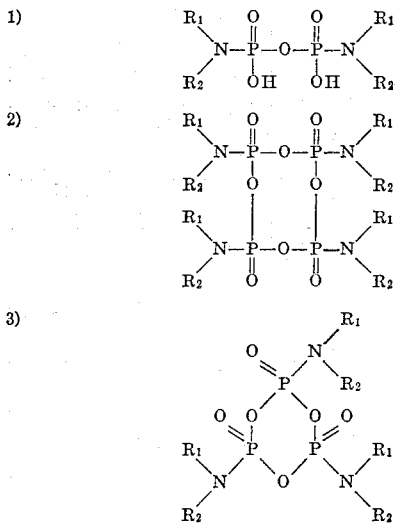

Since in general 1 mol of phosphorus pentoxide is reacted with 2 mols alkylamine, these reaction products are capable of reacting still further. The conversion product obtained when reacting 2 mols methyl dodecyl amine with 1 mol phosphorus pentoxide, for example, reacts further with gaseous ammonia to form the phosphoric acid alkyl amide-mono- or diamide. If this compound is heated to high temperatures, there may also occur an imide bond between two P-atoms. Instead of ammonia there may also be used organic amines. Furthermore, the reaction products of alkyl amines and phosphorus pentoxide react with alcohols to form the corresponding ester amides.

There may, therefore, be used as an antistatic agent also the compound

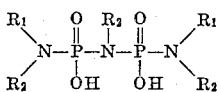

wherein $R_1$ and $R_2$ have the above meaning.

As antistatic agents to be used according to the invention there are especially suitable polyphosphoric acid amides having the following amide groupings:

octadecylamide
heptadecylamide
dodecylamide
decylamide
methyloctadecylamide
methyldodecylamide
methylundecylamide
or mixtures of these amides.

It has been found that the incorporation of only a small amount of such polymeric polyphosphoric acid amides to the polymers imparts an excellent antistatic effect so that articles made from such mixtures no longer charge at the surface and no longer exhibit a tendency towards attracting dust.

It is also advantageous that mixtures of two or more of the substances having an antistatic effect may be incorporated to the compounds of high molecular weight.

In comparison with the substances hitherto known and used for rendering compounds of high molecular weight resistant to electrostatic charge, for example substituted monophosphoric acid amides, the antistatic agents used in accordance with the present invention have the following advantages:

(1) Phosphoric acid amides can be made very economically, for example by simply reacting phosphorous pentoxide with amines, and in a single reaction stage.

(2) Such compounds are more stable than the monomeric phosphoric acid amides. When incorporating the aforesaid compounds, for example, to thermoplasts, splitting off of ammonia or water was not observed. Undesirable side reactions with the pigments, lubricants or stabilizer systems contained in the plastic materials, therefore, do not occur.

(3) The compounds do not provoke corrosion and thus do not cause damage to the machinery or tools.

(4) Exudation is not observed nor does the surface become hygroscopic. The surface gloss even improves.

The substances used as antistatic agents are well compatible with the polymers. The antistatic effect that is obtained is independent of the humidity of the surroundings and is of practically unlimited duration. The products are physiologically harmless.

The antistatic effect of the substances used according to the invention is very good. It has hitherto only been possible to render polymeric materials resistant to electrostatic charge in such an effective way by using very complicated substances. Moreover, the antistatic agents used in accordance with the present invention are compounds that are easily accessible.

The mechanical and thermal properties, the thermostability under load as well as color, transparency and resistance to ageing of polymers are generally unchanged by the addition of the substances of the invention. The working conditions and the temperature range in which plastic materials can be shaped, for example, by a thermoplastic process, remain substantially the same.

By the addition of substances of the aforementioned category, the macromolecular substances enumerated hereunder may be improved, for example: Polystyrene and copolymers of styrene with butadiene, acrylonitrile and/or vinyl carbazole, polyvinyl chloride and copolymers of vinyl chloride with, for example, vinyl acetate, butadiene, acrylic acid esters and methacrylic acid esters, polyterephthalates, polyolefins, such as polymers and copolymers of ethylene, propylene, butene-(1), pentene-(1), 4-methylpentene-(1), hexene-(1), 5,5-dimethylhexene-(1), octadecene-(1), 4-phenylbutene-(1), as well as vinylcyclohexene, polycarbonates, polyoxymethylenes, polyacrylonitrile, polyacrylic acid esters, polymethacrylic acid esters, polyacetates, polyvinylacetals, polyamides, polyurethanes, cellulose derivatives and mixtures containing the enumerated polymers. Also unsaturated polyesters and raw materials for lacquers may be rendered resistant to electrostatic charge prior to or during their processing by an addition of the above-mentioned antistatic agents. The antistatic effect obtained is especially pronounced in the case of thermoplasts, especially in the case of polyolefins and polystyrenes modified with butadiene or acrylonitrile.

The macromolecular substances may contain the usual additives such as, for example, stabilizers, fillers or dyestuffs.

Depending on the nature of the plastic material the compounds may be admixed in the melt, in solution or by application to the pulverulent or granular high molecular polymer. The admixture is most advantageously effected prior to or during processing. It has been found that the technique of incorporation is of little importance. It is important, however, that the antistatic agents are distributed in the plastic material as uniformly as possible.

The macromolecular materials rendered resistant to electrostatic charge by the process of the invention may be processed by all customary processing methods, for example, on molding presses, injection molding machines or extruders. From these macromolecular materials, therefore, there may be made compression and injection molded articles, semi-finished goods, sheets, inflated hollow articles, tubes, fibres, filaments and monofilaments. The resins for paints and varnishes admixed with the compounds of the invention can be processed in the usual manner as lacquers and varnishes. The high molecular weight polymers which have been rendered resistant to electrostatic charge in this manner are particularly useful for packaging purposes (packing material, canisters, bottles, beakers), as accessories for vacuum cleaners, band-conveyors, showroom patterns and masters, parts of casings (for example for radio and television sets, vacuum cleaners), electric installations, for example, lighting fixtures, cable insulations, plugs, switches or armatures, air conditioning and ventilating equipments, plastics table ware, kitchen machinery, filaments, fibres, fabrics, sheets, lacquers, that is in all cases in which resistance to electrostatic charge is required.

The antistatic effect of inorganic or organic compounds in macromolecular materials can be determined most easily by means of cigarette ash. For testing the materials plates obtained by extrusion, injection or compression molding are vigorously rubbed with a woollen cloth for about 15 seconds and held about 2 mm. above a layer of cigarette ash. When the plates have good antistatic properties, they do not attract cigarette ash. Since cigarette ash is somewhat hydroscopic and the electrical properties of moist cigarette ash differ from those of dry cigarette ash, the ash used for the test should be not older than 6 hours.

The following examples serve to illustrate the invention, but they are not intended to limit it thereto:

Examples

There were first prepared the following reaction products from phosphorus pentoxide and alkyl amines:

*Condensation product A.*—0.8 mol phosphorus pentoxide was reacted with 2 mols N-methylstearylamine in an agitator vessel at a temperature of 130° C. A very hard, light-yellow wax was obtained which solidified upon cooling and was then ground.

*Condensation product B.*—1 mol phosphorus pentoxide was reacted with 2 mols stearylamine at a temperature of 190° C. After the melt had cooled off, the solidified mass was ground.

*Condensation product C.*—0.8 mol phosphorus pentoxide was reacted with 2 mols of a mixture of 50% methylstearylamine and 50% methylhexadecylamine at a temperature of 160° C. in an agitator vessel. After cooling and solidifying, the mass was ground.

*Condensation product D.*—1.6 mols phosphorus pentoxide were reacted with 4 mols methyldodecylamine at 180° C. in an agitator vessel. In the course of 2 hours, at 140° C., an excess amount of gaseous ammonia was passed into the clear melt which had undergone brownish discoloration. In this process 2 mols ammonia were reacted. After cooling, a wax-like product was obtained.

*Condensation product E.*—0.5 mol phosphorus pentoxide was reacted with 2 mols methylstearylamine at 200° C. in an agitator vessel. The product was ground after cooling.

The reaction products so obtained were incorporated to various macromolecular substances. Table I lists the test results which show that an excellent antistatic effect can be attained with all of the compounds enumerated.

| Example No. | Plastic Material | Antistatic Agent | Addition, Percent | Attraction of ash |
|---|---|---|---|---|
| 1 | Low-pressure polyethylene | Condensation product C | 0.2 | (¹) |
| 2 | Polypropylene | Condensation product D | 0.5 | (¹) |
| 3 | Polyamide | Condensation product B | 1 | (¹) |
| 4 | Polyacetal resin | Condensation product C | 1 | (¹) |
| 5 | Polyvinyl chloride | Condensation product B | 1.2 | (¹) |
| 6 | Butadiene-styrene-copolymer | Condensation product C | 4.0 | (¹) |
| 7 | High-pressure polyethylene | Condensation product A | 3 | (¹) |
| 8 | Polystyrene | do | 1.5 | (¹) |
| 9 | Polyvinyl acetate | Condensation product E | 2 | (¹) |
| 10 | Polypropylene | Diphosphoric acid-di-N-methyl-stearylamide | 1.5 | (¹) |
| 11 | do | Diphosphoric acid-di-N-stearylamide | 6.0 | (¹) |
| 12 | do | Di-(phosphoric acid-N-methylstearylamide)-imide | 1.5 | (¹) |
| 13 | do | tetra-phosphoric acid-tetramethylstearylamide | 1.5 | (¹) |
| 14 | Polypropylene (comparison example) | | | (²) |

¹ Strong attraction of ash. ² No attraction of ash.

We claim:

1. A process for rendering high molecular weight organic compounds resistant to electrostatic charge which comprises incorporating into the high molecular weight organic compound at least one polymer of an N-alkyl substituted phosphoric acid amide in which amide the P-atoms are chemically bonded through oxygen or nitrogent atoms and the proportion of P:N is from 1:1 to 1:2 and wherein the N-alkylamide groups have the formula

wherein $R_1$ means H or an alkyl group having 1 to 4 carbon atoms and $R_2$ means an alkyl group having 10 to 26 carbon atoms.

2. The process of claim 1, wherein 0.1 to 7 percent by weight, calculated on the high molecular weight organic compound of a polymer of an N-alkyl substituted phosphoric acid amide is incorporated into the high molecular weight organic compound.

3. The process of claim 1, wherein the high molecular weight organic compound is a thermoplastic resin.

4. Process of claim 1, wherein the high molecular weight organic compound is a polyolefin.

5. The process of claim 1, wherein the polymer of an N-alkyl substituted phosphoric acid amide is a polymeric linear or cross-linked N-alkyl substituted phosphoric acid amide which has been obtained by reacting one mol $P_2O_5$ and 2 to 4 mols of an N-mono- or dialkyl amine wherein alkyl has the meaning given for $R_1$ and $R_2$ in claim 1.

6. The process of claim 1, wherein the polymer of an N-alkyl substituted phosphoric acid amide is a polymeric linear of crosslinked N-alkyl substituted phosphoric acid amide which has been obtained by reacting one mol $P_2O_5$ and 2 to 4 mols of an N-mono- or dialkyl amine wherein alkyl has the meaning given for $R_1$ and $R_2$ in claim 1, and subsequently reacting the product obtained with ammonia.

7. The process of claim 1, wherein the polymer of an N-alkyl substituted phosphoric acid amide is a polymeric linear or crosslinked N-substituted phosphoric acid amide of the frmula:

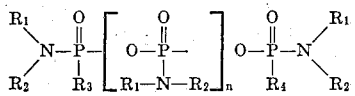

wherein $R_1$ means H or an alkyl group having 1 to 4 carbon atoms, $R_2$ is an alkyl group having 10 to 26 carbon atoms, $R_3$ and $R_4$ each mean, independently of one another, OH or

or together

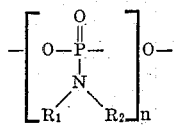

and $n$ means a number from 0 to 20 and $m$ is 1 or 2.

8. Composition of matter consisting essentially of (a) a high molecular weight organic compound and (b) 0.1 to 7 percent by weight, calculated on the high molecular weight organic compound, of at least one polymer of an N-alkyl substituted phosphoric acid amide in which amide the P-atoms are chemically bonded through oxygen or nitrogen atoms and the proportion of P:N is from 1:1 to 1:2 and wherein the N-alkyl amide groups have the formula

wherein $R_1$ means H or an alkyl group having 1 to 4 carbon atoms and $R_2$ is an alkyl group having 10 to 26 carbon atoms, said polymer of an N-alkyl substituted phosphoric acid amide imparting antistatic properties to the composition.

9. The composition of claim 8, wherein the high molecular weight organic compound is a thermoplastic resin.

10. The composition of claim 8, wherein the high molecular weight organic compound is a polyolefin.

11. The composition of claim 8, wherein the polymer of an N-alkyl substituted phosphoric acid amide is a polymeric linear or crosslinked N-alkyl substituted phosphoric acid amide which has been obtained by reacting 1 mol $P_2O_5$ and 2 to 4 mols of an N-mono- or dialkyl amine, wherein alkyl has the meaning given for $R_1$ and $R_2$ in claim 8.

12. The composition of claim 8, wherein the polymer of an N-alkyl substituted phosphoric acid amide is a polymeric linear or crosslinked N-alkyl substituted phosphoric acid amide which has been obtained by reacting one mol $P_2O_5$ and 2 to 4 mols of an N-mono- or dialkyl amine wherein alkyl has the meaning given for $R_1$ and $R_2$ in claim 8, and subsequently reacting the product obtained with ammonia.

13. The composition of claim 8, wherein the polymer of an N-alkyl substituted phosphoric acid amide is a polymeric linear or crosslinked N-alkyl substituted phosphoric acid amide of the formula

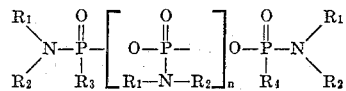

wherein $R_1$ means H or an alkyl group having 1 to 4 carbon atoms, $R_2$ is an alkyl group having 10 to 26 carbon atoms, $R_3$ and $R_4$ each mean, independently of one another, OH or

or together

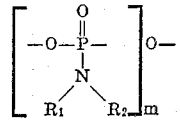

and $n$ means a number from zero to 20 and $m$ is 1 or 2, said polymer of an N-alkyl substituted phosphoric acid amide imparting antistatic properties to the composition.

References Cited

FOREIGN PATENTS 6,414,876   6/1965   Netherlands.

JOSEPH L. SCHOFER, *Primary Examiner.*

L. EDELMAN, *Assistant Examiner.*